Nov. 28, 1967  E. A. SIMI  3,354,736
BELT SLIP PULLEY DRIVE SYSTEM
Filed Oct. 4, 1965
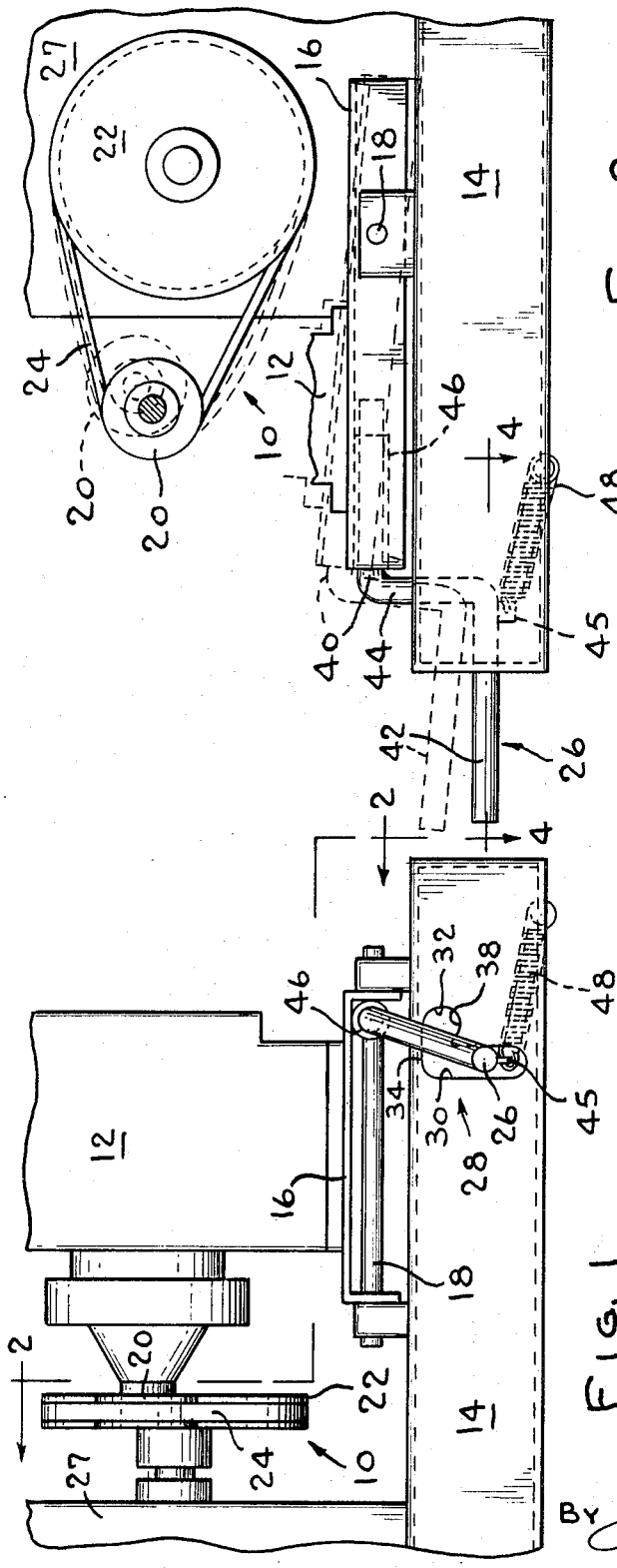
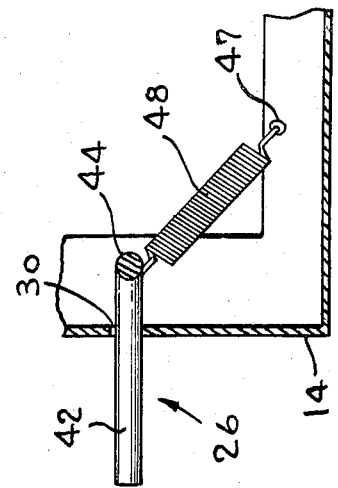
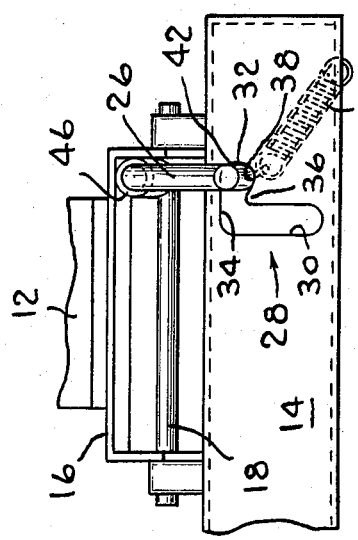
INVENTOR
EDWARD A. SIMI
BY Joseph D. Lemignini
ATTORNEY United States Patent Office 3,354,736
Patented Nov. 28, 1967

3,354,736
BELT SLIP PULLEY DRIVE SYSTEM
Edward A. Simi, Milwaukee, Wis., assignor to Douglas Motors Corporation, Milwaukee, Wis., a corporation of Wisconsin
Filed Oct. 4, 1965, Ser. No. 492,413
8 Claims. (Cl. 74—242.13)

ABSTRACT OF THE DISCLOSURE

In accordance with this disclosure an interlock arrangement is provided to hold the movable pulley of a belt slip pulley drive system in the inoperative position, or more specifically in a position where driving tension on the belt has been removed. The interlock arrangement includes a fixed slot and an operating member in the slot and connected for movement with the movable pulley. The slot has a vertical leg which is of sufficient length to accommodate movement of the operating member, and correspondingly the movable pulley, to permit the movable pulley to assume an operative position applying driving tension to the belt. The slot also includes a fixed land which is spaced vertically from the position which the operating member assumes when the first pulley is in its operative position and is displaced horizontally from the first leg. The slot also includes an obstruction projecting vertically between the land and the first leg and terminating in an opening through which the land and leg communicate. Engagement between the operating member and the land holds the first pulley in its inoperative position and the obstruction prevents direct movement of the operating member from the land to the first leg. A spring is connected to the operating member and biases the operating member into engagement with the land.

---

This invention relates to belt slip pulley drive systems.

In such systems a pair of pulleys, a drive pulley and a driven pulley, are connected by a continuous belt. The pulleys are supported for relative movement to vary the distance between their centers. In the operative position of the pulleys the belt is drawn taut and establishes a driving connection between the pulleys. To interrupt the driving connection the center distance between pulleys is reduced to release the tension on the belt allowing it to slip on the pulleys.

A general object of this invention is to provide an improved belt slip pulley drive system.

A more specific object of this invention is to provide an improved interlock arrangement for holding the drive and driven pulleys in an inoperative position wherein the driving connection therebetween is interrupted.

A further, specific object of this invention is to provide such an interlock arrangement which is adapted to resist vibration while the pulleys are held in their inoperative position and prevent undesired relative movement of the pulleys to reestablish the driving connection.

Other objects and advantages will be pointed out in, or be apparent from, the specification and claims, as will obvious modifications of the embodiment shown in the drawings, in which:

FIG. 1 is a front elevation of a typical embodiment of this invention illustrating the interlock arrangement with the pulley drive in its inoperative position;

FIG. 2 is a section view taken along line 2—2 in FIG. 1;

FIG. 3 is a partial front elevation of the embodiment illustrating the interlock arrangement with the pulley drive in its operative position; and FIG. 4 is a section view generally along line 4—4 in FIG. 2.

With particular reference to the drawings, a belt slip pulley drive system 10 is associated with a suitable motor 12 shown schematically in FIG. 1. Motor 12 is supported on platform 16 which is in turn pivotally mounted on frame 14 by rod 18 for movement about a horizontal axis defined by the rod. Driving pulley 20 is connected to and driven from motor 12 in a conventional manner. Drive pulley 22 is operatively connected to driving pulley 20 through one or more continuous belts 24.

Motor 12, platform 16 and driving pulley 20 are movable jointly about the axis defined by rod 18 to move pulley 20 toward and away from driven pulley 22. The pulley drive system (specifically drive pulley 20) is in an operative position when the driving pulley 20 is in the illustrated full line position. In this position belt 24 is drawn tightly between the pulleys and establishes a driving connection. In a manner to be described more completely hereinafter, platform 16 can be pivoted upwardly to move driving pulley 20 toward driven pulley 22. This upward movement reduces the center distance between the pulleys to release the tension on belt 24 and interrupt the driving connection between the driving and driven pulleys. With this arrangement the driving connection between the pulleys can be selectively made and interrupted by merely pivoting platform 16 in a generally vertical direction about the horizontal axis defined by rod 18.

Typical applications for drive systems of this type are in connection with various construction equipment, for example mortar mixer 27 connected to and driven with pulley 22, wherein the drive systems are usually exposed to shock and vibration. Pivotal movement of platform 16, and correspondingly movement of driving pulley 20 toward pulley 22, is effected through an operating rod 26 connected to the platform and extending outwardly of the frame for ready access. In order to positively hold driving pulley 22 in its inoperative or released position, an interlock arrangement is provided which positively holds the entire assembly (comprising the platform, motor and driving pulley) with the driving pulley in its inoperative position and prevents movement of that assembly which would allow the driving pulley to return to its operative position unless the interlock arrangement is released. More specifically, rod 26 constitutes a part of the interlock arrangement and is associated with a slot 28 provided in frame 14. Slot 28 includes vertical leg 30 and shorter vertical leg 32 which is spaced horizontally from leg 30. The legs are separated by a vertically extending obstruction 36 which terminates at a generally horizontal passage 34 extending between legs 30 and 32 to provide communication therebetween. Shorter leg 32 terminates in a closed end defining land 38 and obstruction 36 extends upwardly from the land terminating at passage 34. Leg 30 is of sufficient length to accommodate movement of rod 26 as the driving pulley is moved toward and away from its operative position. As illustrated in FIG. 1, when the driving pulley is in its operative position rod 26 is spaced from the lower end of leg 30. Land 38 is spaced vertically above the position rod 26 assumes when the driving pulley is in its operative position so that when rod 26 is engaged with the land the pulley is held away from its operative position and assumes and is held in an inoperative position (the dotted line showing in FIG. 2).

Rod 26 is generally Z-shaped including horizontal legs 40 and 42 and a vertical leg 44 connecting the horizontal legs. A relatively simple connection of the rod to platform 16 is provided by tubular member 46 and spring 48. Tube 46 is welded, or otherwise suitably connected, to the underside of platform 16 and spring 48 is connected to the rod at tab 45 and extends to one side of and back toward the tube 46 to a seat in opening 47 on frame 14. In this manner rod 26 is biased with respect to the tube so that the portion of vertical leg 44 at the joint between the vertical leg and horizontal leg 40 is held in engagement with tube 46. Also, the spring biases the rod in a counterclockwise direction (FIG. 1) so that the rod is biased toward engagement with land 38. Moreover, horizontal leg 42 extends through slot 28 with frame 14 preventing movement of the rod in one direction and tube 46 preventing rod movement in an opposite direction so that once assembled the rod cannot be accidently separated from the assembly. With this arrangement rod 26 is connected for joint vertical movement with platform 16 and is also capable of pivotal movement in tube 46 in a generally horizontal direction. The rod 26 then moves along a generally vertical path in displacing the platform and drive pulleys between the operative and inoperative pulley positions and is also capable of horizontal movement (or movement transverse to the aforementioned path) when it is aligned with passage 34.

In operation and assuming pulley 20 to be in its operative position so that a driving connection is made between the driving and driven pulleys, rod 26 is positioned in leg 30 of the slot. To interrupt the driving connection, platform, motor 12 and driving pulley 20 are moved in unison by grasping operating rod 26 and moving the rod upwardly in slot leg 30. This movement displaces driving pulley 20 toward the driven pulley reducing the center distance therebetween and relieving the tension on belt 24 allowing it to slip over the pulleys. When rod 26 reaches passage 34 the operator, with the assistance of spring 48, moves the rod in a counterclockwise direction (in FIG. 1) whereupon the motor platform driving pulley and rod are permitted to lower in slot leg 32 and engage land 38. Land 38 holds the platform, motor and driving pulley in a position corresponding to an inoperative position of the driving pulley. Obstruction 36 prevents movement of the driving pulley to its operative position, wherein driving tension would be re-established on the driving belt, without releasing the interlock arrangement. The interlock arrangement is released by positively moving rod 26, and correspondingly the platform, motor and driving pulley, upwardly a sufficient distance to clear obstruction 36 whereupon rod 26 can be turned clockwise in passage 34 to align rod 26 for downward movement in slot leg 30. Accordingly, to re-establish the driving connection a positive movement of the operating rod is required and the operating rod must be moved upwardly against the weight of the motor and turned clockwise against the force of spring 48 to position the rod in leg 30 whereupon the motor and platform can be lowered to re-establish driving tension on belt 24. This interlocking arrangement makes optimum use of the weight of motor 12 in that the motor weight is used to maintain the driving pulley in its inoperative position by urging rod 26 into engagement with land 38 and also is used to lower the driving pulley into its operating position. Moreover, slot 30 having a length sufficient to accommodate rod movement as the driving pulley is moved between its operative and inoperative positions and having its lower end spaced from the rod when the driving pulley is in its operative position the weight of the motor is used to maintain driving tension on belt 24.

Although but one embodiment of the present invention has been illustrated and described, it will be apparent to those skilled in the art that various changes and modifications may be made therein without departing from the spirit of the invention or from the scope of the appended claims.

I claim:

1. A pulley drive assembly comprising, in combination, first and second relatively spaced pulleys, a belt extending between and engaging both of said pulleys, first means supporting said first pulley for generally vertical movement toward and away from said second pulley to vary the center distance between said pulleys, said first means supporting said first pulley for movement from a normal, lower operative position wherein said belt is drawn taut between said pulleys to establish a driving connection therebetween toward an inoperative position generally above said normal position wherein said center distance is reduced and the tension on said belt is relieved to interupt said driving connection, and interlocking means including an operating member, second means defining a first vertically extending path, a land spaced horizontally from said first vertical path and an obstruction extending in a generally vertical direction and arranged horizontally between said land and said vertical path, said obstruction terminating at an opening providing communication between said land and said first path, said operating member engaged with said second means and supported for movement in a generally horizontal direction so that said operating member is movable between said land and said path, one of said operating member and said second means being connected to and movable with said first pulley, said operating member spaced from said opening when said first pulley is in said operative position and movement of said first pulley in a direction away from its operating position producing relative movement between said operating member and second means along said path and in a direction to move said operating means past said obstruction for movement in said opening for engagement with said land, said land and said operating member arranged to hold said first pulley away from said operative position when said operating member is engaged with said land.

2. The combination of claim 1 including means biasing said operating member in a direction for engagement with said land.

3. The combination of claim 1 wherein said first means includes a platform, a motor on and movable with said platform and connected to said first pulley to transmit driving movement thereto, and said first means also including means supporting said platform for pivotal movement about a horizontal axis to move said first pulley toward and away from said operative position so that the weight of said motor tends to position said first pulley in its operative position and to hold said operating member in engagement with said land.

4. The combination of claim 1 wherein said second means defines a slot having a first vertically extending leg, a second leg spaced horizontally from and having a vertical extension less than said first leg and terminating in a closed end located above the lower end of said first leg and defining said operating member receiving land, and wherein said obstruction extends in a generally vertical direction with respect to said land and terminates at said opening providing communication between said first and second legs, said first leg being of sufficient length to accommodate relative movement of said operating member sufficient to move said first pulley into its operative position and said second leg being of limited length and said land and said operating member arranged to hold said first pulley away from said operating position when said operating member is engaged with said land.

5. A pulley drive assembly comprising, in combination, first and second relatively spaced pulleys, a frame, first means connected to said frame and supporting said first pulley for movement toward and away from said second pulley to vary the center distance between said pulleys, said first means supporting said first pulley for generally vertical movement from an operative position wherein said belt is drawn taut between said pulleys to establish a driving connection therebetween toward an inoperative position wherein said center distance is reduced and the tension on said belt is relieved to interrupt said driving connection, and interlocking means including an operating member connected to and movable with said first means and said first pulley and second means defining a slot in said frame, said operating member being engaged in said slot and said slot including a first leg having a length sufficient to accommodate movement of said operating member as said first pulley moves into its operative position and a second leg terminating in a closed end defining a land spaced laterally from said first leg and arranged intermediate the ends of said first leg and an obstruction between said land and first leg with respect to said land in the direction of said first leg extension and terminating at an opening extending between and providing communication between said first and second legs.

and means connecting said operating member to said first means for movement therewith in said first leg and also for movement with respect to said first means generally transversely of said first leg extension so that said operating member is movable in said first and second legs and between said first and second legs for engagement with said fixed land, said fixed land spaced along said first leg extension away from the position said operating member assumes in said first leg when said first pulley is in its operative position to hold said first pulley away from its operating position when said operating member and land are engaged.

6. The combination of claim 5 wherein said first means includes a platform, a motor on and movable with said platform and connected to said first pulley to transmit driving movement thereto, and said first means also including means supporting said platform for pivotal movement about a horizontal axis to move said pulley toward and away from said first position so that the weight of said motor tends to position said first pulley in said operative position and to hold said operating member in engagement with said land.

7. The combination of claim 5 including spring means connected between said frame and said operating member biasing said operating member for movement in said transverse direction and in a direction for engagement with said land.

8. A pulley drive assembly comprising, in combination, first and second relatively spaced pulleys, a belt extending between and engaging both of said pulleys, first means supporting said first pulley for movement toward and away from said second pulley to vary the center distance between said pulleys, said first means supporting said first pulley for movement from an operative position wherein said belt is drawn taut between said pulleys to establish a driving connection therebetween toward an inoperative position wherein said center distance is reduced and the tension on said belt is relieved to interrupt said driving connection, a fixed frame, and interlocking means for holding said first pulley away from said operative position and including, an operating member, means connecting said operating member to said first pulley for movement therewith as said first pulley is moved toward and away from said operative position and also connecting said operating member for movement transversely of the direction of movement of said operating member with said first pulley, means defining a slot in said fixed frame having a first extension in the direction of joint movement of said operating member with said first pulley to provide a path for operating member movement, a fixed land spaced from said first slot extension in said transverse direction to one side of said path, and an opening between said land and first slot extension, said operating member extending into said slot and movable in said first slot extension and into and out of engagement with said land, said land located along said first slot extension to hold said operating member and first pulley away from said operative position when said operating member is in engagement with said land, an obstruction between said land and first slot extension and projecting into said opening beyond said land in the direction of said joint operating member and first pulley movement to prevent direct transverse movement of said operating between said land and first slot extension, and spring means connected to said operating member and biasing said operating member in said transverse direction and toward engagement with said land.

References Cited
UNITED STATES PATENTS

| 1,651,254 | 11/1927 | Cnossen | 74—242.1 X |
| 2,283,153 | 5/1942 | Koch | 74—242.15 X |
| 2,785,762 | 3/1957 | Gahler | 74—242.15 X |

MILTON KAUFMAN, *Primary Examiner.*

FRED C. MATTERN, *Examiner.*

J. A. WONG, *Assistant Examiner.*